United States Patent
Cai et al.

(10) Patent No.: US 11,870,345 B2
(45) Date of Patent: Jan. 9, 2024

(54) ADAPTIVE ON-TIME GENERATION FOR THREE-LEVEL POWER CONVERTERS

(71) Applicant: Apple Inc., Cupertino, CA (US)

(72) Inventors: Chongli Cai, San Jose, CA (US);
Dingkun Du, Santa Clara, CA (US);
Michael B. Nussbaum, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 199 days.

(21) Appl. No.: 17/482,287

(22) Filed: Sep. 22, 2021

(65) Prior Publication Data

US 2023/0096741 A1 Mar. 30, 2023

(51) Int. Cl.
*H02M 3/158* (2006.01)
*G06F 1/28* (2006.01)
*H02M 3/157* (2006.01)
*H02M 1/00* (2006.01)

(52) U.S. Cl.
CPC .............. *H02M 3/158* (2013.01); *G06F 1/28* (2013.01); *H02M 3/157* (2013.01); *H02M 1/0003* (2021.05)

(58) Field of Classification Search
None
See application file for complete search history.

(56) References Cited

U.S. PATENT DOCUMENTS

| | | |
|---|---|---|
| 10,084,384 B1 | 9/2018 | Kotikalapoodi |
| 10,720,837 B1 | 7/2020 | Agrawal et al. |
| 10,884,043 B1 * | 1/2021 | Couleur ................. H03K 7/08 |
| 10,903,741 B1 * | 1/2021 | Couleur ............... H02M 3/156 |
| 2020/0021196 A1 | 1/2020 | Scoones et al. |
| 2022/0302827 A1 * | 9/2022 | Tarroboiro ............ H02M 3/158 |
| 2023/0102278 A1 * | 3/2023 | Pardi ..................... H02M 3/157 |
| | | 323/282 |

FOREIGN PATENT DOCUMENTS

WO WO-2019066929 A1 * 4/2019 .............. H02M 3/07

* cited by examiner

*Primary Examiner* — Matthew V Nguyen
(74) *Attorney, Agent, or Firm* — Kowert, Hood, Munyon, Rankin & Goetzel, P.C.; Dean M. Munyon

(57) ABSTRACT

A power converter circuit included in a computer system may include multiple devices and a switch node coupled to a regulated power supply node via an inductor. During a first time period, the power converter charges a capacitor, and the couples the capacitor to the switch node during a second time period. During a third time period the power converter couples the switch node to an input power supply node. To maintain constant charge delivered to the load during each time the switch node is coupled to the input power supply node, the duration of the third time period is adjusted based on a voltage level of the input power supply node, a voltage level of the regulated power supply node, a value of the inductor, and the durations of first and second time periods.

20 Claims, 13 Drawing Sheets

Table 401
Vout/Vin < 1$^{st}$ threshold
(Low Conversion Ratio)

|  | Cycle 1 | Cycle 2 | Cycle 3 | Cycle 4 | Cycle 5 | Cycle 6 |
|---|---|---|---|---|---|---|
| Active Devices | 301, 303 | 303, 304 | 304 | 302, 304 | 303, 304 | 303 |

Table 402
Vout/Vin > 2$^{nd}$ threshold
(High Conversion Ratio)

|  | Cycle 1 | Cycle 2 | Cycle 3 | Cycle 4 | Cycle 5 | Cycle 6 |
|---|---|---|---|---|---|---|
| Active Devices | 301, 302 | 301, 303 | 301 | 301, 302 | 302, 304 | 302 |

Table 403
1$^{st}$ threshold < Vout/Vin < 2$^{nd}$ threshold
(Medium Conversion Ratio)

|  | Cycle 1 | Cycle 2 | Cycle 3 | Cycle 4 |
|---|---|---|---|---|
| Active Devices | 301, 302 | 301, 303 | 303, 304 | All Devices Off |

|  | Cycle 5 | Cycle 6 | Cycle 7 | Cycle 6 |
|---|---|---|---|---|
| Active Devices | 301, 302 | 302, 304 | 303, 304 | All Devices Off |

ADAPTIVE ON-TIME GENERATION FOR THREE-LEVEL POWER CONVERTERS

BACKGROUND

Technical Field

This disclosure relates to power management in computer systems and more particularly to voltage regulator circuit operation.

Description of the Related Art

Modern computer systems may include multiple circuits blocks designed to perform various functions. For example, such circuit blocks may include processors, processor cores configured to executed execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generated regulator voltage levels on respective power supply signals using a voltage level of an input power supply signal. Such regulator circuits may employ multiple passive circuit elements, such as inductors, capacitors, and the like.

SUMMARY OF THE EMBODIMENTS

Various embodiments for generating a regulated power supply voltage level are disclosed. Broadly speaking, a power converter circuit includes a switch circuit, and a control circuit. The switch circuit includes a plurality of devices, a capacitor, and a switch node coupled to a regulated power supply node via an inductor, and is configured to couple, during a first time period of a first cycle of a particular switching sequence, the capacitor between an input power supply node and the switch node using a first subset of the plurality of devices. The switch circuit is further configured to couple, during a second time period of the first cycle of the particular switching sequence, the capacitor between the switch node and a ground supply node using a second subset of the plurality of devices, and couple, during a third time period of the first cycle of the particular switching sequence, the switch node to the input power supply node using a third subset of the plurality of devices. The control circuit configured to adjust a duration the third time period based on a voltage level of the input power supply node, a voltage level of the regulated power supply node, a value of the inductor, and respective durations of first time period and the second time period.

BRIEF DESCRIPTION OF THE DRAWINGS

FIG. 4 is a series of tables depicting active devices during each cycle of different switching sequences.

DETAILED DESCRIPTION OF EMBODIMENTS

Figure 1:
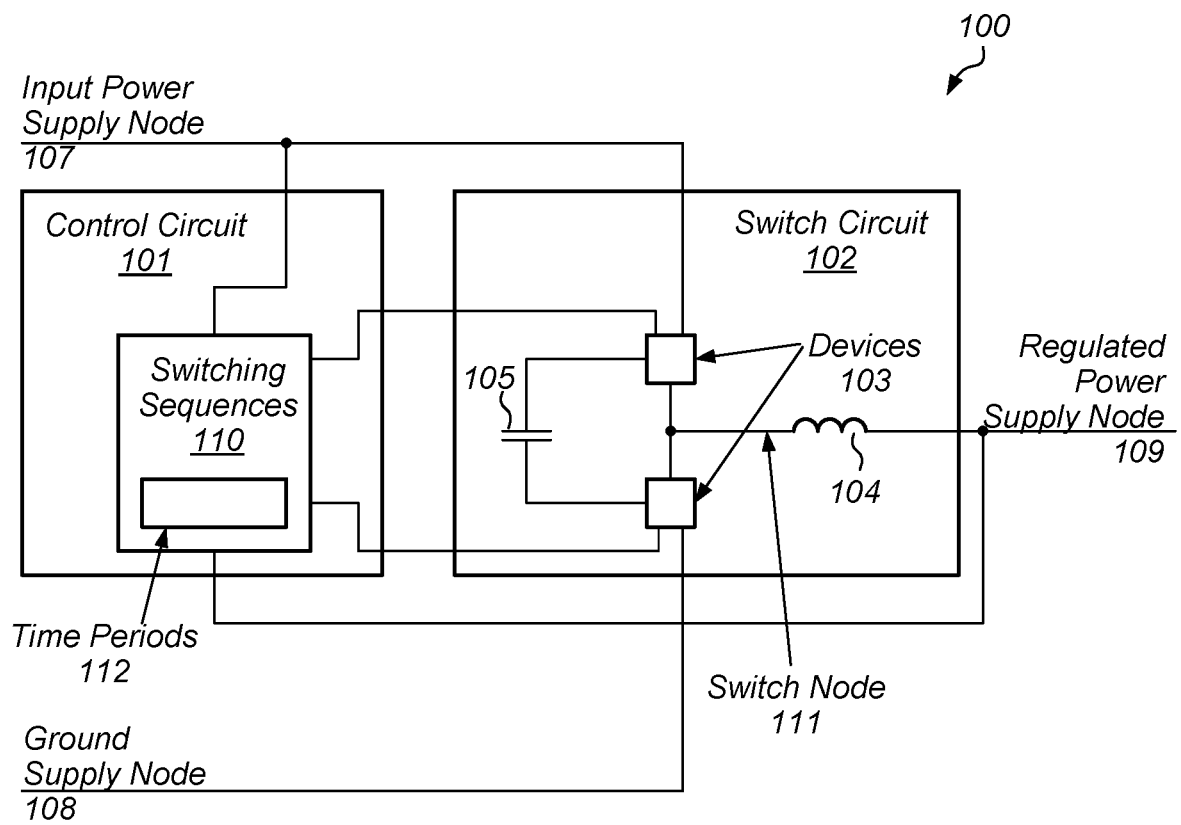
FIG. 1 is a block diagram of an embodiment of a power converter circuit for a computer system.

Computer systems may include multiple circuit blocks configured to perform specific functions. Such circuit blocks may be fabricated on a common substrate and may employ different power supply voltage levels. Power management units (commonly referred to as "PMUs") may include multiple voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a three-level buck converter circuit. Such converter circuits include multiple devices and a switch node that is coupled to a regulated power supply node via an inductor. For a given switching sequence, the switch node is coupled to a fly capacitor using different sets of the multiple devices included in the converter circuit during different cycles of operation of the voltage regulator circuit. As used and described herein, a switching sequence specifies one or more devices of a voltage regulator circuit are activated during each cycle of a plurality of cycles used during the operation of a voltage regulator circuit.

Three-level buck converters can be operated in different operation modes. In one mode, current flows through the inductor in each cycle of the multiple switching cycles included in a given switching sequence. Such modes are referred to as continuous conduction modes (CCM). Alternatively, in another mode, no current may flow in the inductor in one or more of the cycles. This type of mode is referred to as discontinuous conduction mode (DCM).

Different switching sequences may be used during the different operation modes of a voltage regulator circuit. A selection of switching sequences may be based on whether the voltage regulator circuit is operating in CCM or DCM mode, as well as a value for a conversion ratio for the voltage regulator circuit in order to maintain efficient operation of the voltage regulator circuit. As used and described herein, a conversion ratio is a ratio of a voltage level of an output regulated power supply node generated by the voltage regulator circuit to a voltage level of an input power supply node for the regulator circuit. It is noted that, in some embodiments, the ratio of the voltage level of the input power supply node to the voltage level of the output regulated power supply node may also be used.

In some cases, a value of the conversion ratio may be used to determine operation mode of the voltage regulator circuit. Such operation modes may activate devices within the regulator circuit according to different sequences in order to source energy to a load circuit(s) coupled to the output of the regulator circuit. In some embodiments, the value of the conversion ratio may be compared to a threshold value and different operation modes selected based on result of the comparison. For example, the conversion ratio may be compared to a threshold value of fifty percent. When the conversion ratio is less than fifty percent a low conversion ratio operation mode is selected and when the value of the conversation ratio is greater than fifty percent, a high conversion ratio operation mode is selected.

Changes across the range of voltage levels for the input power supply node and the range voltage levels for the regulated power supply node can cause variation in an amount of undesired voltage excursions, or ripple, of the regulated supply node, which can affect load circuit performance. The embodiments illustrated in the drawings and described below may provide techniques for a power converter to maintain a constant charge during each inductor current pulse by adjusting, based on the voltage level of the input power supply node, the duration of the time period during which the switch node of the power converter is coupled to the input power supply node.

A block diagram depicting an embodiment of a power converter circuit is illustrated in FIG. 1. As illustrated, power converter circuit 100 includes control circuit 101 and switch circuit 102, which includes devices 103, fly capacitor 105, and inductor 104. Devices 103 are coupled to fly capacitor 105 and switch node 111, and are controlled by control signals 106. Inductor 104 is coupled to switch node 111 and regulated power supply node 109.

Switch circuit 102 is configured to couple, during a first time period of a first cycle of a particular switching sequence of switching sequences 110, capacitor 105 between input power supply node 107 and switch node 111 using a first subset of devices 103. Switch circuit 102 is further configured to couple, during a second time period of the first cycle of the particular switching sequence, capacitor 105 between switch node 111 and a ground supply node using a second subset of devices 103. Additionally, switch circuit 102 is configured to couple, during a third time period of the first cycle of the particular switching sequence, switch node 111 to input power supply node 107 using a third subset of devices 103.

Control circuit 101 is configured to adjust a duration of the third time period based on a voltage level of input power supply node 107, a voltage level of regulated power supply node 109, a value of inductor 104, and respective durations of the first time period and the second time period. It is noted that during adjustments to the third time period, control circuit 101 is configured to maintain the respective durations of the first and second time periods, leaving the time periods fixed within the tolerance of circuits included in control circuit 101. By adjusting the duration of the third time period, control circuit 101 may maintain a constant level of charge on capacitor 105, thereby reducing voltage ripple on regulated power supply node 109.

Figure 2:
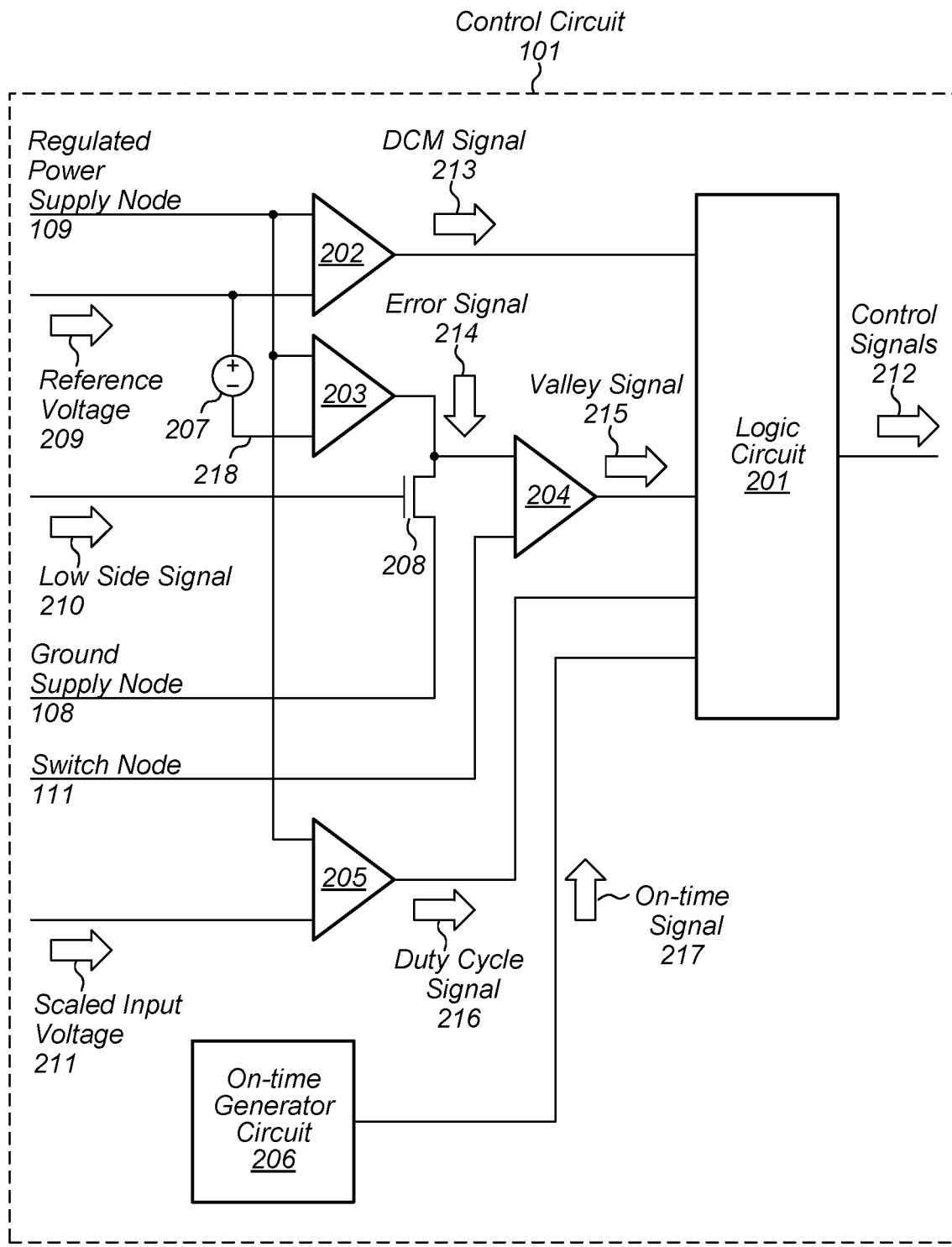
FIG. 2 is a block diagram of an embodiment of a control circuit included in a power converter circuit.

Turning to FIG. 2, a block diagram of an embodiment of control circuit 101 is depicted. As illustrated control circuit 101 includes logic circuit 201, comparator circuits 202-205, on-time generator circuit 206, voltage source 207, and device 208.

Comparator circuit 202 is configured to compare a voltage level of regulated power supply 109 to reference voltage 209 to generate a signal (denoted "DCM signal 213) that initiates an active period of power converter circuit 100 causing power converter circuit 100 to exit an idle state. In some embodiments, reference voltage 209 may be a desired value for the voltage level of regulated power supply node 109, and comparator circuit 202 may be configured to activate DCM signal 213 in response to a determination that the voltage level of regulated power supply node 109 is less than reference voltage 209. In various embodiments, comparator circuit 202 may be implemented as a Schmitt trigger circuit or any other suitable circuit.

Voltage source 207 is configured to generate an offset version of reference voltage 209 on node 218. In various embodiments, the value of the offset may be selected to set a transition point between DCM and CCM operation. Voltage source 207 may, in various embodiments, be implemented using a linear regulator circuit, or any other circuit suitable for changing a voltage level of a signal.

Comparator 203 is configured to generate error signal 214 using the voltage level of regulated power supply node 109 and a voltage level of node 218. In various embodiments, comparator 203 may be configured to generate error signal 214 such that a voltage level of error signal 214 may be proportional to a difference between the voltage level of regulated power supply node 109 and the voltage level of node 218. Comparator 203 may, in some embodiments, be implemented using a differential amplifier circuit.

Comparator 205 is configured to generate duty-cycle signal 216 using the voltage level of regulated power supply node 109 and scaled input voltage 211 In various embodiments, a value duty-cycle signal 216 may be indicative of a particular duty cycle (e.g., high duty cycle) based on a comparison of the voltage level of regulated power supply node 109 and scaled input voltage 211. Although duty-cycle signal 216 is depicted as a single signal, in other embodiments, duty-cycle signal 216 may include multiple signals whose values encode a particular duty cycle. Comparator 205 may, in various embodiments, be implemented using a Schmitt trigger circuit, or any other suitable comparator circuit.

Device 208 is configured to couple the output of comparator 203 to ground supply node 108 using low-side signal 210. In various embodiments, device 208 may couple the output of comparator 203 to ground supply node 108, in response to a determination that low-side signal 210 is active. Device 208 may, in various embodiments, be implemented as an n-channel metal-oxide semiconductor field-effect transistor (MOSFET), a Fin field-effect transistor (FinFET), a gate-all-around field-effect transistor (GAAFET), or any other suitable transconductance device.

Comparator 204 is configured to generate valley signal 215 using error signal 214 and a voltage level of switch node 111. In various embodiments, comparator 204 may activate valley signal 215, in response to a determination that the voltage level of switch node 111 is less than error signal 214. Comparator 204 may be implemented using a Schmitt trigger or other suitable comparator circuit. It is noted that although comparator 204 is depicted as generating a signal for use with valley-mode regulation, in other embodiments, comparator 204 may be configured to generate a signal compatible with peak-mode regulation.

On-time generator circuit 206 is configured to generate on-time signal 217. In some embodiments, on-time generator circuit 206 may adjust the on-time during an active period. As described below in more detail, on-time generator circuit 206 may employ a combination of currents to charge a capacitor whose voltage is compared against a threshold voltage to determine a duration of the on-time.

Logic circuit 201 is configured to generate control signals 212 using DCM signal 213, valley signal 215, duty cycle signal 216, and on-time signal 217. As described below, control signals 212 may correspond to control signals 306-309 using to activate and de-actives switch devices in switch circuit 102. In various embodiments, logic circuit 201 may be implemented using a state machine or other suitable sequential logic circuit, in combination with one or more combinatorial logic circuits.

Figure 3:
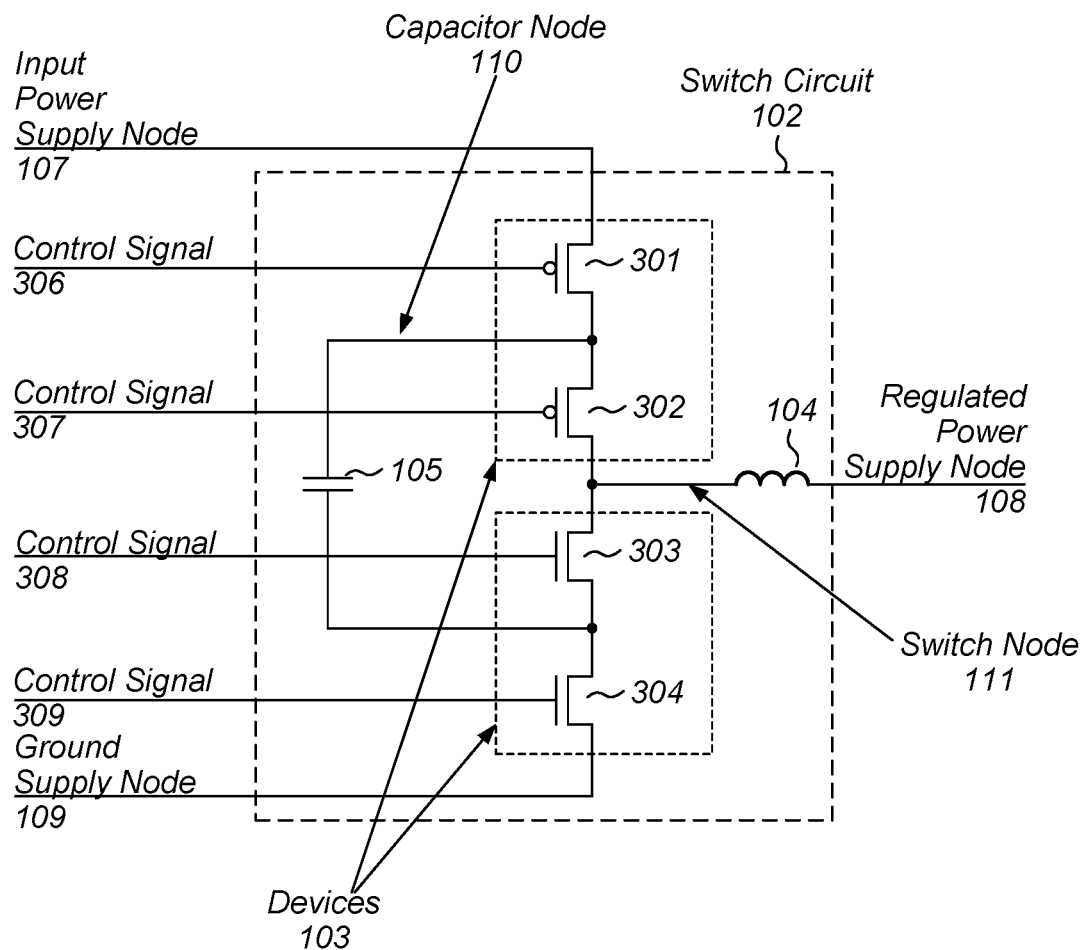
FIG. 3 is a block diagram of an embodiment of a switch circuit.

Switch circuits, such as switch circuit 102, may be designed according to one of various design styles. A block diagram of an embodiment of switch circuit 102 is depicted in FIG. 3. As illustrated, switch circuit 102 includes devices 103, inductor 104, and fly capacitor 105.

One terminal of fly capacitor 105 is coupled between devices 301 and 302, and the other terminal of fly capacitor 105 is coupled between devices 303 and 304. In various embodiments, fly capacitor 105 may be located on a same integrated circuit as switch circuit 102, and may be implemented using a metal-oxide-metal (MOM) structure, a metal-insulator-metal (MIM) structure, or any other suitable capacitor structure available as part of a semiconductor manufacturing process. In other cases, fly capacitor 105 may be located on a different integrated circuit, or be a discrete component mounted on a board or other substrate to which an integrated circuit included switch circuit 102 is also mounted.

In a similar fashion to fly capacitor 105, inductor 104, which is coupled between switch node 111 and regulated power supply node 108, may be fabricated on the same integrated circuit as switch circuit 102. In other embodiments, inductor 104 may be a discrete component that is co-located on a circuit board or other substrate to which switch circuit 102 is also mounted.

Devices 103 include devices 301 through 304. As illustrated, device 301 is coupled to input power supply node 107 and device 302, and is controlled by control signal 306. Device 302 is coupled to device 301 and switch node 111, and is controlled by control signal 307. In a similar fashion, device 303 is coupled between switch node 111 and device 304, while device 304 is coupled between a ground circuit node and device 303. Device 303 is controlled by control signal 308, and device 304 is controlled by control signal 309. In various embodiments, control signals 306-309 are included in control signals 212 as depicted in FIG. 1.

In various embodiments, devices 301 and 302 may be implemented as either p-channel or n-channel MOSFETs, FinFETs, GAAFETs, or other suitable transconductance devices. In a similar fashion, devices 303 and 304 may be implemented as n-channel MOSFETs, FinFETs, GAAFETs, or other suitable transconductance devices.

Turning to FIG. 4, three tables are illustrated which depict an example of devices active during different cycles for various operating regimes of voltage regulator circuit 102. Each operating regime is identified by the ratio of the voltage level of regulated power supply node 109 (identified as "Vout") to the voltage level of input power supply node 107 (identified as "Vin"). In a low conversion ratio regime, the ratio of Vout/Vin is less than a first threshold, while in a high conversion ratio regime, the ratio of Vout/Vin is greater than a second threshold value. When the ratio of Vout/Vin is between the first and second thresholds, voltage regulator circuit 102 is operating in a medium conversion ratio regime. As described above, in some embodiments, the first and second thresholds made be centered around 50%. For example, the first threshold may be 40% and the second threshold may be 60%.

Table 401 depicts which devices are active during which cycle while voltage regulator circuit 102 is operating in low conversion ratio regime. During cycle 1, devices 301 and 303 are active, while the remaining devices included in devices 103 are inactive, thereby coupling fly capacitor 105 between input power supply node 107 and switch node 111.

At the conclusion of cycle 1, device 301 is de-activated and device 304 is activated during cycle 2. With this arrangement of active devices, a conduction path from switch node 111 to ground is provided, allowing current to flow back from inductor 104 to ground. With the conclusion of cycle 2, device 303 is de-activated and device 302 activated in cycle 3. The arrangement of active devices in cycle 3, couples fly capacitor 105 to switch node 111, allowing current to flow from fly capacitor 105 to inductor 104.

When cycle 3 concludes, cycle 4 is initiated by de-activating device 302 and re-activating device 303. In a similar fashion to cycle 2, cycle 4 provides a conduction path between switch node 111 and ground. It is noted that the duration of each cycle is determined by control circuit 101, may be adjusted based on operating conditions, in response to user input, or any other suitable mechanism. Although only four cycles were depicted in Table 401, in other embodiments, additional cycles, e.g., a tri-state cycle where all devices are inactive, may be employed.

Table 402 depicts which devices are active in the cycles when voltage regulator circuit 102 is operating in a high conversion ratio regime. In the case of high conversion ratio operation, devices 301 and 302 are active during cycle, coupling one terminal of fly capacitor 105 to input power supply node 107. At the conclusion of cycle 1, device 302 is de-activated and device 303 is activated during cycle 2. With the arrangement of active devices in cycle 2, allows for fly capacitor 105 to be charged using input power supply node 107.

Upon the conclusion of cycle 2, cycle 3 returns to the same configuration of active devices as cycle 1. When cycle 3 ends, device 301 is de-activated and device 304 is activated in cycle 4. The arrangement of active devices in cycle 4, couples fly capacitor 105 to switch node 111, allowing current to flow from fly capacitor 105 to inductor 104. At the conclusion of cycle 4, operation may resume with cycle 1 until a change in the conversion ratio is detected. As with the operation described in regard to Table 401, additional cycles may be employed during high conversion ratio operation as well.

As described above, in a transition from low conversion ratio operation to high conversion ratio operation (or vice-versa), a medium conversion ratio set of cycles may be employed. The cycles depicted in Table 403 are referred to as a "hybrid mode" as the active devices are a mixture of both the high conversion ratio cycles and the low conversion ratio cycles.

During cycle 1, devices 301 and 302 may be activated, coupling both switch node 111 and one terminal of fly capacitor 105 to input power supply node 107. Upon the conclusion of cycle 1, cycle 2 begins with device 301 remaining active, while device 302 is deactivated and device 303 is activated. The arrangement of active devices in cycle 2 allows for fly capacitor 105 to be charged using input power supply node 107.

During cycle 3, devices 303 and 304 are activated, while the other devices are inactive, providing a conduction path from switch node 111 to ground. cycle 3, all of devices 301-304 are inactive, providing a high impedance to switch node 111.

Once cycle 4 has ended, devices 301 and 302 are re-activated as cycle 5 starts, again coupling switch node 111 to input power supply node 109. During cycle 6, devices 301 is deactivated and device 304 is activated. This arrangement of active devices in cycle 6 couples fly capacitor 105 to switch node 111.

Upon the completion of cycle 6, devices 303 and 304 are activated for cycle 7. The activation of devices 303 and 304, as with cycle 3, provides a conduction path from switch node 111 to ground. To complete the sequence of cycles, cycle 8, like cycle 4, deactivates all of the devices.

Figure 5:
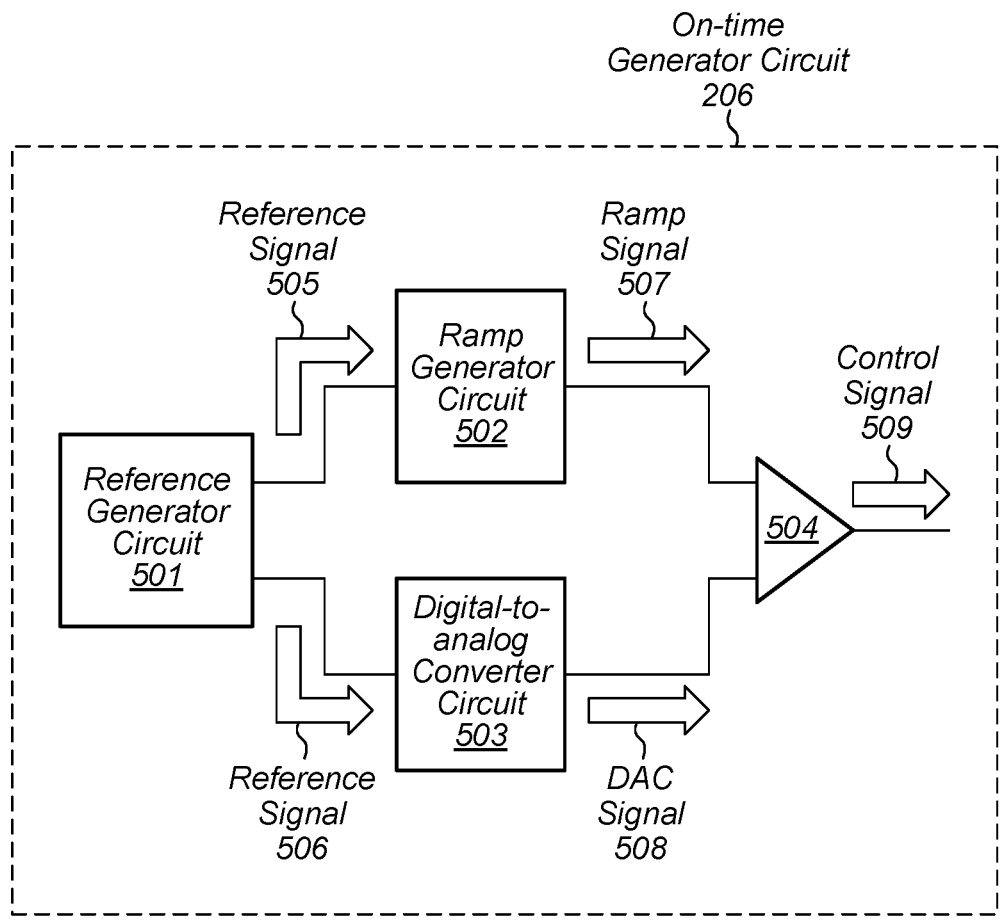
FIG. 5 is a block diagram of an embodiment of an on-time generator circuit.

A block diagram of on-time generator circuit 206 is depicted in FIG. 5. As illustrated, on-time generator circuit 206 includes reference generator circuit 501, ramp generator circuit 502, digital-to-analog converter circuit 503, and comparator circuit 504.

Reference generator circuit 501 is configured to generate reference signal 505 and reference signal 506. As described below, reference generator circuit 501 may employ a resistive voltage divider circuit, or any other suitable circuit configured to generate multiple reference voltage levels. It is noted that, in some embodiments, respective values of reference signals 505 and 506.

Turning to FIG. 5, a block diagram of on-time generator circuit 206 is depicted. As illustrated, on-time generator circuit 206 includes reference generator circuit 501, ramp generator circuit 502, digital-to-analog converter circuit 503, and comparator circuit 504.

Reference generator circuit 501 is configured to generate reference signal 505 and reference signal 506. In various embodiments, reference signal 505 and reference signal 506 may be DC signals, each having a respective voltage level. As described below, reference generator circuit 501 may be implemented using multiple resistors, or any other suitable circuit configured to generate two or more voltage levels.

Ramp generator circuit 502 is configured to generate ramp signal 507 using reference signal 505. As described below, to generate ramp signal 507, ramp generator circuit 502 may be further configured to generate a current using reference signal 505, and charge a capacitor with the generated current.

Digital-to-analog converter circuit 503 is configured to generate DAC signal 508 using reference signal 506. As described below, to generate DAC signal 508, digital-to-analog converter circuit may be further configured to generate a current that tracks the voltage level of input power supply node 107 using reference signal 506, and subtract the tracking current from a reference current. In various embodiments, digital-to-analog converter circuit 503 may be further configured to generate DAC signal 508 using a difference between the reference current and the tracking current.

Comparator circuit 504 is configured to generate control signal 509 using ramp signal 507 and DAC signal 508. In various embodiments, comparator circuit 504 may activate control signal 509, in response to a determination that a voltage level of ramp signal 507 is greater than a voltage level of DAC signal 508. Comparator circuit 504 may, in various embodiments, be implemented as a differential amplifier, a Schmitt trigger circuit, or any other suitable circuit configured to compare the respective voltage levels of two signals.

Figure 6:
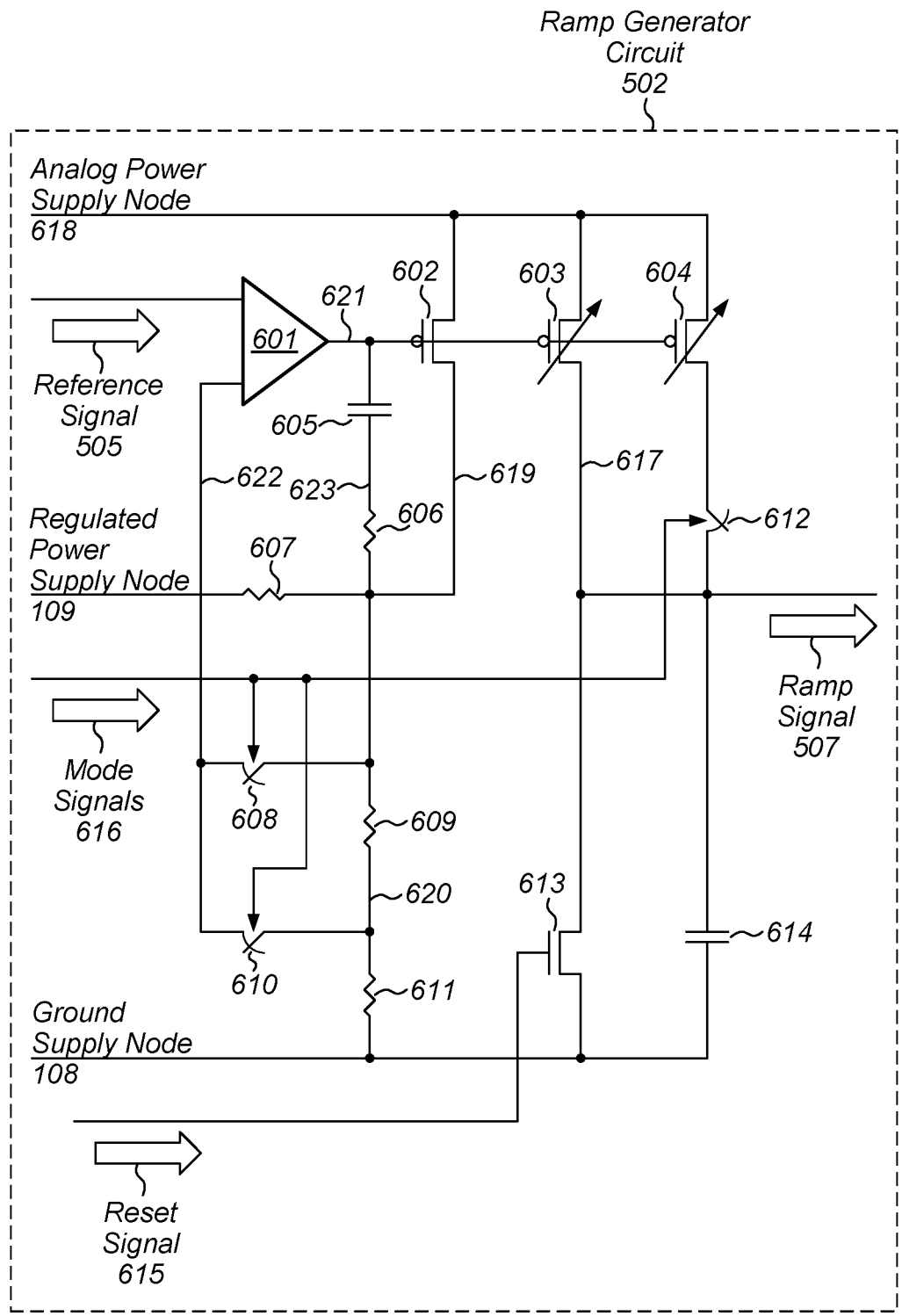
FIG. 6 is a block diagram of an embodiment of a ramp generator circuit.

Turning to FIG. 6, a block diagram of ramp generator circuit 502 is depicted. As illustrated, ramp generator circuit 502 includes comparator circuit 601, devices 602-604, 613, capacitors 605 and 614, resistors 606, 607, 609, and 611, and switches 608, 610, and 612.

Device 602 is coupled between analog power supply node 618 and node 619, which is, in turn, coupled to resistor 607, which is coupled to regulated power supply node 109. Device 602 is configured to source, based on a voltage level of node 621, a current from analog power supply node 618. It is noted that a tolerance of a voltage level analog power supply node 618 may be less than a corresponding tolerance of a voltage level of a power supply node coupled to digital circuits to minimize noise and improve performance of ramp generator circuit 502.

In a similar fashion, device 603 is coupled between analog power supply node 618 and node 617, while device 604 is coupled between analog power supply node 618 and switch 612. Devices 603 and 604 are configured to source respective currents from analog power supply node 618 based on the voltage level of node 621. In various embodiments, the respective sizes of devices 603 and 604 may be adjusted based on different duty cycles or other suitable operation parameters of power converter circuit 100.

In various embodiments, devices 602-604 may be implemented as p-channel MOSFETs, FinFETs, GAAFETs, or any other suitable transconductance devices, while device 613 may be implemented as an n-channel MOSFET, FinFET, GAAFET, or any other suitable transconductance device.

Current sourced from devices 603 and 604 charge capacitor 614, which is coupled between node 617 and ground supply node 108. As capacitor 614 charges, the voltage level of ramp signal 507 increases in a linear fashion. In various embodiments, capacitor 614 may be implemented using a metal-oxide-metal (MOM) capacitor structure, a metal-insulator-metal (MIM) capacitor structure, or any other suitable capacitor structure available on a semiconductor manufacturing process.

Comparator circuit 601 is configured to convert reference signal 505 to respective currents in 602-604 by generating a voltage level on node 621. In various embodiments, comparator circuit 601 may be further configured to compare a voltage level of reference signal 505 to a voltage level of node 622 to generate the voltage level on node 621. As described below, the voltage level on node 622 may be a function of an operation parameter (e.g., duty cycle) of power converter 100. By employing the voltage level of node 622, comparator circuit 601 can adjust the voltage level on node 621 based on the operation parameter. In various embodiments, comparator circuit 601 may be implemented using a differential amplifier circuit, or any other suitable circuit configured to generate an output voltage level based on a comparison of at least two input voltage levels.

Capacitor 605 is coupled between node 621 and node 623. Resistor 606 is coupled between node 623 and node 619, which is, in turn coupled to regulated power supply node 109 via resistor 607. In various embodiments, capacitor 605 may be configured to filter high-frequency noise on node 621, in addition to providing local energy storage for node 621 to prevent rapid changes in voltage.

Resistor 609 is coupled between node 619 and node 620. Resistor 611 is coupled between node 620 and ground supply node 108. In various embodiments, resistors 609 and 611 form a resistive voltage divider configured to generate a voltage level on node 620 whose value is a function of the values of resistors 609 and 611.

Switch 608 is configured to couple node 619 to node 622 based on mode signals 616. In a similar fashion, switch 610 is configured to couple node 620 to node 622 based on mode signals 616. It is noted that although mode signals 616 is depicted as a single wire, in various embodiments, mode signals 616 may include multiple signals, with different ones of the multiple signals coupled to switches 608 and 610. In various embodiments, switches 608 and 610 may be implemented as pass gates or any other suitable switching circuit.

Resistors 606, 607, 609, and 611 may be implemented using polysilicon, metal, or any other suitable material available on a semiconductor manufacturing process. Capacitors 605 and 614 may be implemented using a metal-oxide-metal (MOM) structure, a metal-insulator-metal structure (MIM), or any other suitable capacitor structure available on the semiconductor manufacturing process.

Switch 612 is configured to couple device 604 to node 617 based on mode signals 616. In various embodiments, when switch 612 is closed, device 604 sources a current to node 617 increasing a rate at which node 617 is charged, thereby increasing a slope of ramp signal 507.

Device 613 is coupled between node 617 and ground supply node 108. In various embodiments, device 613 is configured to couple node 617 to ground supply node 108, in response to an activation of reset signal 615. When node 617 is coupled to ground supply node 108, node 617 is discharged and the voltage level of ramp signal 507 decreases to a level at or near ground potential. In various embodiments, device 613 may be implemented as an n-channel MOSFET, FinFET, GAAFET, or any other suitable switching device.

Figure 7:
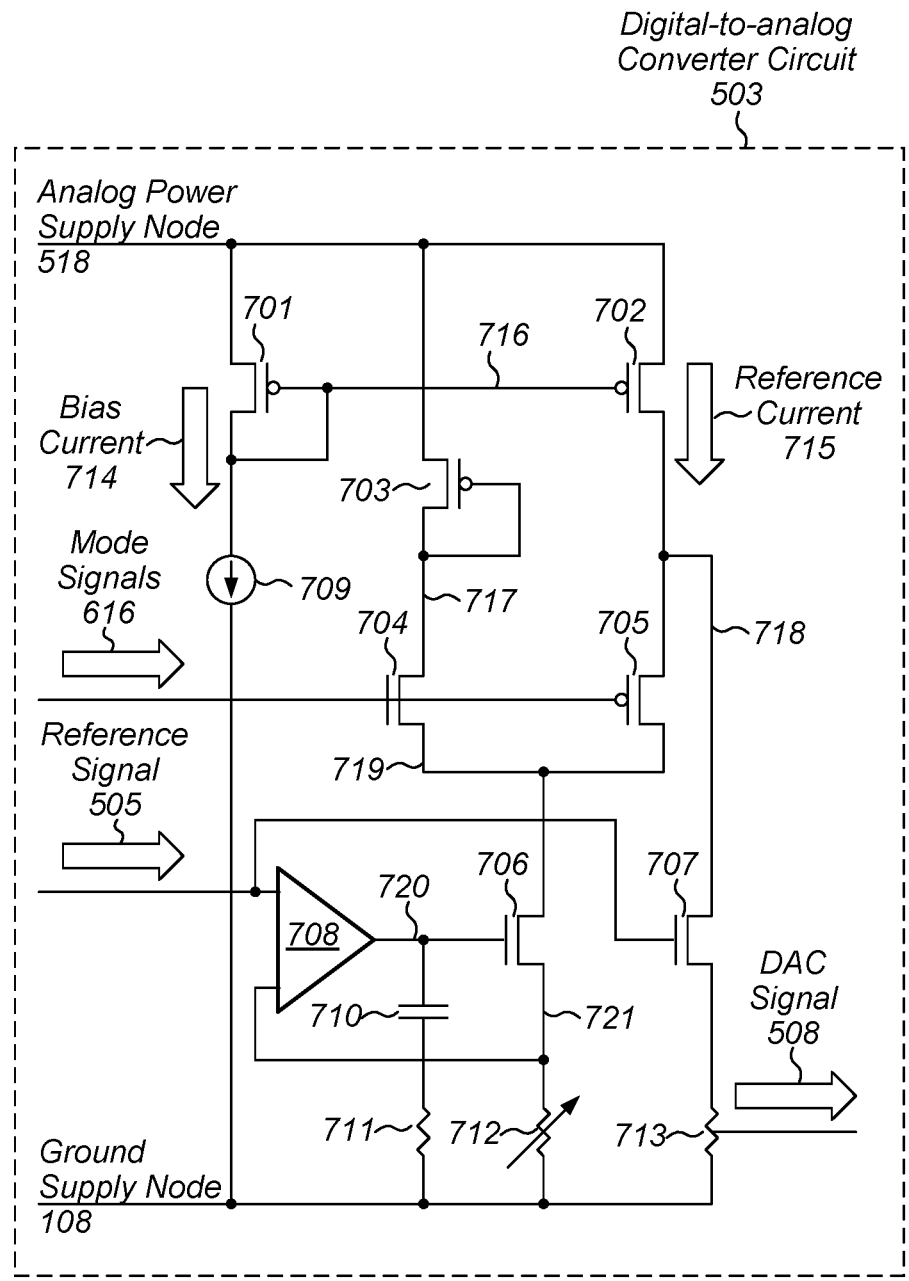
FIG. 7 is a block diagram of an embodiment of a digital-to-analog converter circuit.

Turning to FIG. 7, a block diagram of digital-to-analog converter circuit 503 is depicted. As illustrated, digital-to-analog converter circuit 503 includes devices 701-707, comparator circuit 708, current source 709, capacitor 710, and resistors 711-713.

Devices 701 and 702 are coupled to analog power supply node 618 and are control by a voltage level of node 716. In various embodiments, devices 701 and 702 form a current mirror circuit, such that a current flowing through device 701 is replicated (or "mirrored") in device 702. In various embodiments, devices 701 and 702 may be implemented as p-channel MOSFETs, FinFETs, GAAFETs, or other suitable transconductance device.

Current source 709 is configured to sink bias current 714 from analog power supply node 618 via device 701. Bias current 714 is mirrored in device 702 as reference current 715. In various embodiments, current source 709 may be implemented as a biased transistor, current mirror circuit, or any other suitable circuit capable of generating a supply-independent current.

Device 703 is coupled between analog power supply node 618 and node 717, and is controlled by a voltage level on node 717. In various embodiments, device 703 may be implemented as a p-channel MOSFET, FinFET, GAAFET, or other suitable transconductance device. In some cases.

Device 704 is coupled between node 7171 and node 719, while device 705 is coupled between node 718 and node 719. Devices 704 and 705 are both controlled by mode signals 616. During mid duty-cycle operation, mode signals 616 are set to values such that device 704 is inactive, and device 705 is active, allowing reference current 715 to flow into device 706. During low duty-cycle operation, mode signals 616 are set to values such that device 704 is active and device 705 is inactive, thereby allowing current flowing through device 703 to flow into device 706. In various embodiments, device 704 may be implemented as n-channel MOSFET, FinFET, GAAFET, or any other suitable transconductance device, while device 705 may be implemented as a p-channel MOSFET, FinFET, GAAFET, or other suitable transconductance device.

Device 707 is coupled between node 718 and resistor 713, and is controlled by reference signal 505. Based on a voltage level of reference signal 505, a portion of reference current 715 will flow through device 707, and then through resistor 713 before flowing into ground. Resistor 713 converts the current flowing through device 707 into a voltage to generate DAC signal 5008. It is noted the current flowing through device 707 is the difference between a current that tracks the voltage level of input power supply 107 from reference current 715. In various embodiments, device 707 may be implemented as an n-channel MOSFET, FinFET, GAAFET, or any other suitable transconductance device, while resistor 713 may fabricated using polysilicon, metal, or any other suitable material available on a semiconductor manufacturing process.

Comparator 708 is configured to generate a voltage level on node 720 using reference signal 505 and the voltage level of node 721. In some embodiments, comparator circuit 708 and device 706 function as a voltage-to-current converter circuit, that is configured to translate the voltage level of reference signal 505 to a current flowing in device 706. Device 706 is coupled between node 719 and node 721, and may be implemented as a n-channel MOSFET, FinFET, GAAFET, or any other suitable transconductance device. Comparator circuit 708 may, in various embodiments, be implemented using a differential amplifier circuit or any other suitable circuit configured to generate an output voltage level based on a comparison of at least two input voltage levels Resistor 712 is coupled between node 721 and ground supply node 108. In various embodiments, resistor 712 is adjustable to trim the operation of the voltage-to-current circuit formed by comparator circuit 708 and device 706. Capacitor 710 is coupled between node 720 and resistor 711, which is further coupled to ground supply node 108. In various embodiments, values of capacitor 710 and resistor 711 may be selected to stabilize the operation of the voltage-to-current converter circuit formed by comparator circuit 708 and device 706. Capacitor 710 may be implemented using a metal-oxide-metal (MOM) structure, a metal-insulator-metal structure (MIM), or any other suitable capacitor structure available on the semiconductor manufacturing process, while resistors 711 and 712 may be fabricated using polysilicon, metal, or any other suitable material available on the semiconductor manufacturing process.

Figure 8:
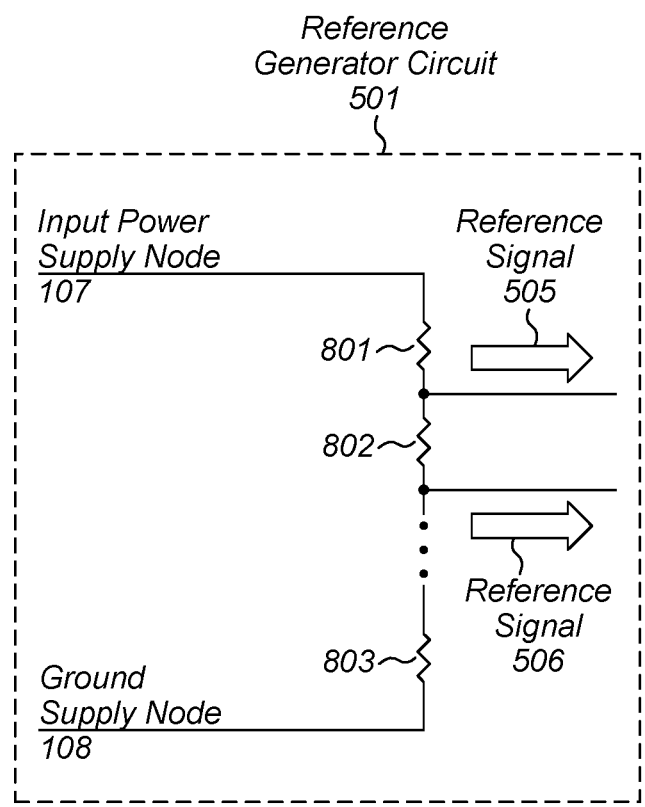
FIG. 8 is a block diagram of an embodiment of a reference generator circuit.

Turning to FIG. 8, a block diagram of an embodiment of reference generator circuit 501 is depicted. As illustrated, reference generator circuit 501 includes resistors 801-803.

Resistors 801-803 are coupled, in series, between input power supply node 107 and ground supply node 108. In various embodiments, resistors 801-803 may be implemented using metal, polysilicon, or any other suitable material available on semiconductor manufacturing process. Values of individual ones of resistors 801-803 may be based on desired values for reference signals 505 and 506, as well as a voltage level of input power supply node 107. Although only three resistors are depicted in the embodiment of FIG. 8, in other embodiments, any suitable number of resistors may be employed.

As current flows from input power supply node 107 to ground supply node 108, voltage drops are developed across individual ones of resistors 801-803. The value of a given voltage drop is based on a value of the current flowing from input power supply node 108 to ground supply node 108, and a value of a corresponding one of resistors 801-803. The value of the current flowing from input power supply node to ground supply node 108 is based on a total series resistance of resistors 801-803 and the voltage level of input power supply node 107.

As illustrated, a voltage level of reference signal 505 corresponds to the voltage level of input power supply node 107 less a voltage drop across resistor 801. In a similar fashion, a voltage level of reference signal 506 corresponds to the voltage level of input power supply node 107 less the combined voltage drops across resistors 801 and 802. It is noted that difference voltage levels may be selected for reference signals 505 and 506 by using different combinations of voltage drops across different ones of resistors 801-803.

Figure 9A:
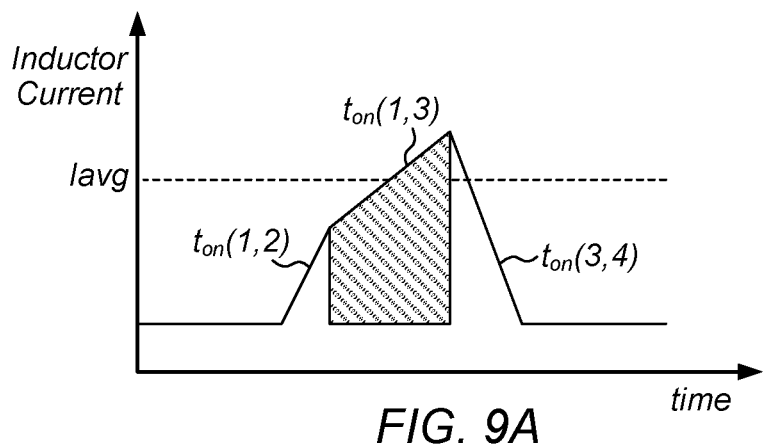
FIG. 9A illustrates an example waveform of inductor current during a particular time period.

Turning to FIG. 9, an example waveform of inductor current generated by a power converter circuit operating in a mid duty-cycle range during a particular time period is depicted. During $t_{on}(1,2)$, devices 301 and 302 are active and devices 303 and 304 are inactive, and current is supplied to regulated power supply node 108 via inductor 104. During $t_{on}(1,3)$ devices 301 and 303 are active and devices 302 and 304 are inactive, coupling fly capacitor 105 to input power supply 107. During $t_{on}(3, 4)$ devices 303 and 304 active and devices 301 and 302 are inactive providing a conduction path from switch node 111 to ground supply node 109.

Since the duration of $t_{on}(1,3)$ is larger than either of the durations of $t_{on}(1,2)$ and $t_{on}(3,4)$, along with the fact that the slope of $t_{on}(1,3)$ is small, the total charge stored in fly capacitor 105 is dominated by the charge delivered during $t_{on}(1,3)$. By adjusting the peak current through inductor 104, the total charge delivered to the fly capacitor 105 may be kept constant.

The peak current through inductor 104 can be controlled my adjusting the duration of $t_{on}(1,2)$. For mid duty-cycle operation, the duration of $t_{on}(1,2)$ can be modified according to Equation 1, where $I_{avg}$ is the average current through inductor 104, $t_{flat}$ is the duration of either $t_{on}(1,3)$ or $t_{on}(3,4)$, V ti n is the voltage level of input power supply node 107, and $V_{out}$ is the voltage level of regulated power supply node 108.

$$t_{on}(1, 2) = I_{avg} \frac{L}{(V_{in} - V_{out})} + 0.5 t_{flat} \frac{V_{out}}{(V_{in} - V_{out})} - 0.25 t_{flat} \frac{V_{in}}{(V_{in} - V_{out})} \quad (1)$$

For low duty-cycle operation, the equation for $t_{on}(1,2)$ can be simplified as shown in Equation 2.

$$t_{on}(1, 2) = I_{peak} \frac{L}{(0.5 V_{in} - V_{out})} \quad (2)$$

Figure 9B:
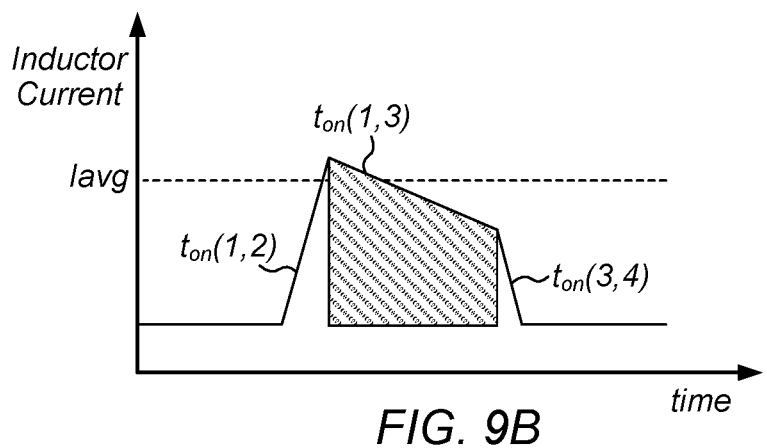
FIG. 9B illustrates an example waveform of inductor current during a different time period.

An example waveform of inductor current operating in a mid duty-cycle range during a different time period is depicted in FIG. 9B. As described above in regard to FIG. 9A, the duration of $t_{on}(1,2)$ is adjusted as described above to avoid zero crossing and keep the charge (denoted by the hashed area) constant during $t_{on}(1,3)$.

Figure 10:
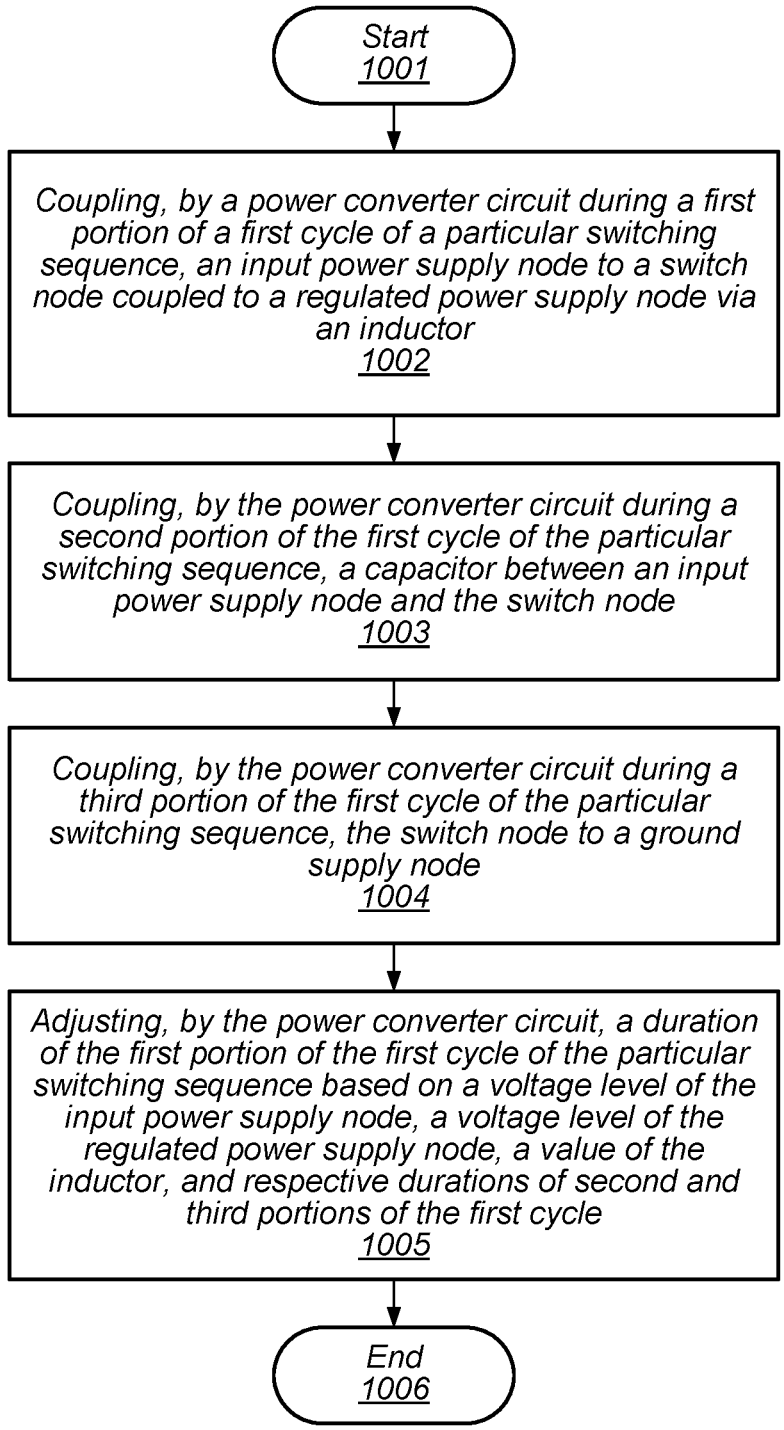
FIG. 10 is a flow diagram depicting an embodiment of a method for operating a power converter circuit.

Turning to FIG. 10, a flow diagram depicting an embodiment of a method for operating a power converter circuit is illustrated. The method, which begins in block 1001, may be applied to various power converter circuit, including power converter circuit 100 as depicted in FIG. 1.

The method includes coupling, by a power converter circuit during a first portion of a first cycle of a particular switching sequence, an input power supply node to a switch node coupled to a regulated power supply node via an inductor (block 1002). The method also includes coupling, by the power converter circuit during a second portion of the first cycle of the particular switching sequence, a capacitor between and input power supply node and the switch node (block 1003). The method further includes coupling, by the power converter circuit during a third portion of the first cycle of the particular switching sequence, the switch node to a ground supply node (block 1004).

The method also includes adjusting, by the power converter circuit, a duration of the first portion of the first cycle of the particular switching sequence based on a voltage level of the input power supply node, a voltage level of the regulated power supply node, a value of the inductor, and respective durations of the second and third portions of the first cycle (block 1005). In some cases, adjusting the duration of the first portion of the first cycle includes: performing, by the power converter circuit, a comparison of a ramp voltage to a reference voltage, and adjusting, by the power converter circuit, the duration of the first portion of the first cycle using result of the comparison. It is noted that the duration of the first portion of the first cycle may be performed over multiple times the switching sequence is executed.

In various embodiments, the method also includes generating, by the power converter circuit, a charging current whose value is based on the voltage level of the input power supply node and the voltage level of the regulated power supply node, and charging, by the power converter circuit, a capacitor using the charging current to generate the ramp voltage. In some embodiments, the method includes generating, by the power converter circuit, a tracking current using the voltage level of the input power supply node, and combining, by the power converter circuit, a reference current and the tracking current to generate the reference voltage. In some cases, combining the reference current and the tracking current includes subtracting, by the power converter, the tracking current from the reference current.

In various embodiments, the method may further include performing, by the power converter circuit, a comparison of the voltage level of the regulated power supply node and the voltage level of the input power supply node, and selecting, by the power converter circuit, a different switching sequence using results of the comparison. The method may further include coupling, by the power converter circuit during a first portion of a given cycle of the different switching cycle, the input power supply node to the switch node, and adjusting, by the power converter circuit, a duration of the first portion the given cycle of the different cycle using the voltage level of the input power supply node, the voltage level of the regulated power supply node, and the value of the inductor. The method concludes in block 1006.

Figure 11:
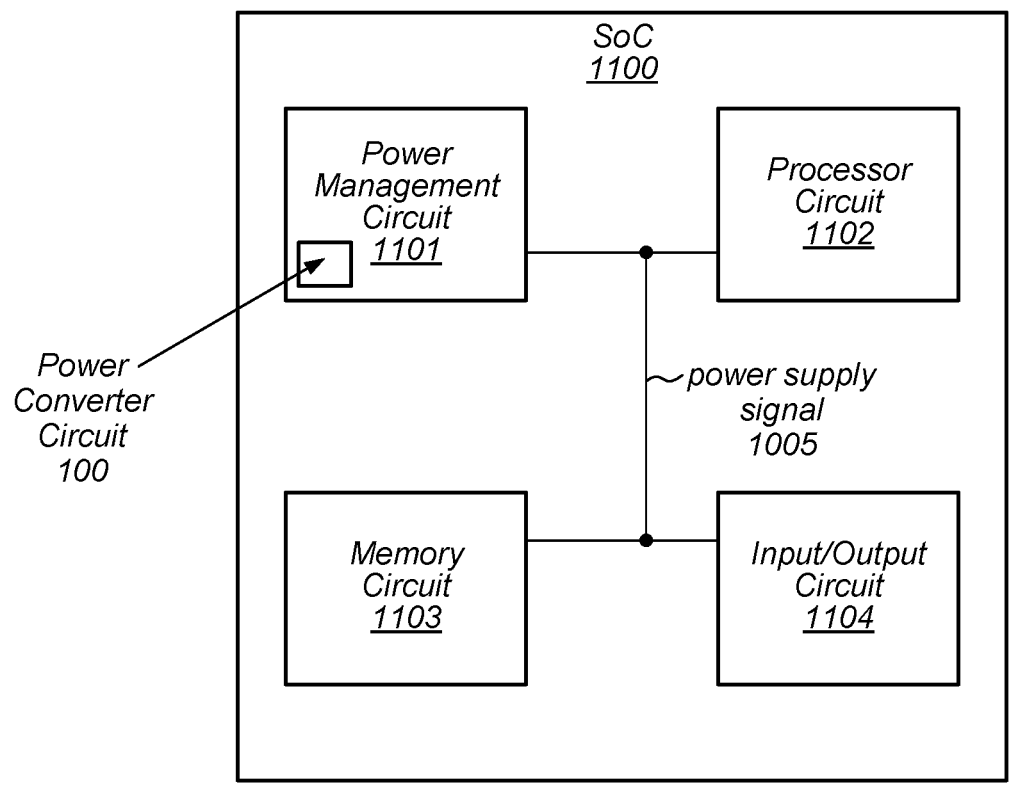
FIG. 11 is a block diagram of one embodiment of a system-on-a-chip that includes a power management circuit.

A block diagram of a system-on-a-chip (SoC) is illustrated in FIG. 11. In the illustrated embodiment, SoC 1100 includes power management unit 1101, processor circuit 1102, input/output circuits 1104, and memory circuit 1103, each of which is coupled to power supply signal 1105. In various embodiments, SoC 1100 may be configured for use in a desktop computer, server, or in a mobile computing application such as, e.g., a tablet, laptop computer, or wearable computing device.

Power management unit 1101 includes power converter circuit 100 which is configured to generate a regulated voltage level on power supply signal 1105 in order to provide power to processor circuit 1102, input/output circuits 1104, and memory circuit 1103. Although power management unit 1101 is depicted as including a single power converter circuit, in other embodiments, any suitable number of power converter circuits may be included in power management unit 1101, each configured to generate a regulated voltage level on a respective one of multiple internal power supply signals included in SoC 1100.

Processor circuit 1102 may, in various embodiments, be representative of a general-purpose processor that performs computational operations. For example, processor circuit 1102 may be a central processing unit (CPU) such as a microprocessor, a microcontroller, an application-specific integrated circuit (ASIC), or a field-programmable gate array (FPGA).

Memory circuit 1103 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although in a single memory circuit is illustrated in FIG. 11, in other embodiments, any suitable number of memory circuits may be employed.

Input/output circuits 1104 may be configured to coordinate data transfer between SoC 1100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1104 may be configured to implement a version of Universal Serial Bus (USB) protocol or IEEE 1394 (Firewire®) protocol.

Input/output circuits 1104 may also be configured to coordinate data transfer between SoC 1100 and one or more devices (e.g., other computing systems or integrated circuits) coupled to SoC 1100 via a network. In one embodiment, input/output circuits 1104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1104 may be configured to implement multiple discrete network interface ports.

Figure 12:
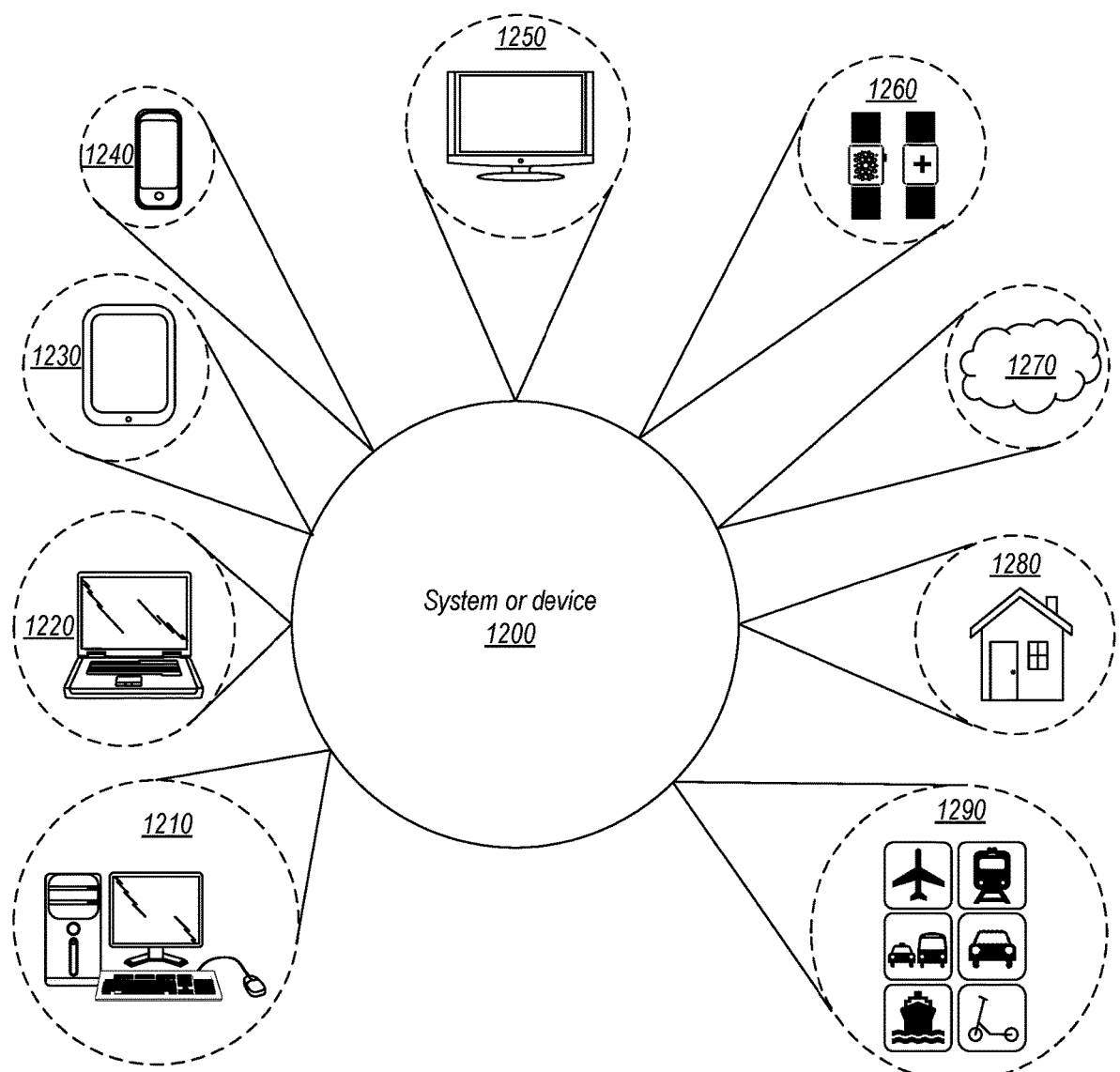
FIG. 12 is a block diagram of various embodiments of computer systems that may include power converter circuits.

Turning now to FIG. 12, various types of systems that may include any of the circuits, devices, or systems discussed above are illustrated. System or device 1200, which may incorporate or otherwise utilize one or more of the techniques described herein, may be utilized in a wide range of areas. For example, system or device 1200 may be utilized as part of the hardware of systems such as a desktop computer 1210, laptop computer 1220, tablet computer 1230, cellular or mobile phone 1240, or television 1250 (or set-top box coupled to a television).

Similarly, disclosed elements may be utilized in a wearable device 1260, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1200 may also be used in various other contexts. For example, system or device 1200 may be utilized in the context of a server computer system, such as a dedicated server or on shared hardware that implements a cloud-based service 1270. Still further, system or device 1200 may be implemented in a wide range of specialized everyday devices, including devices 1280 commonly found in the home such as refrigerators, thermostats, security cameras, etc. The interconnection of such devices is often referred to as the "Internet of Things" (IoT). Elements may also be implemented in various modes of transportation. For example, system or device 1200 could be employed in the control systems, guidance systems, entertainment systems, etc. of various types of vehicles 1290.

The applications illustrated in FIG. 12 are merely exemplary and are not intended to limit the potential future applications of disclosed systems or devices. Other example applications include, without limitation: portable gaming devices, music players, data storage devices, unmanned aerial vehicles, etc.

Figure 13:
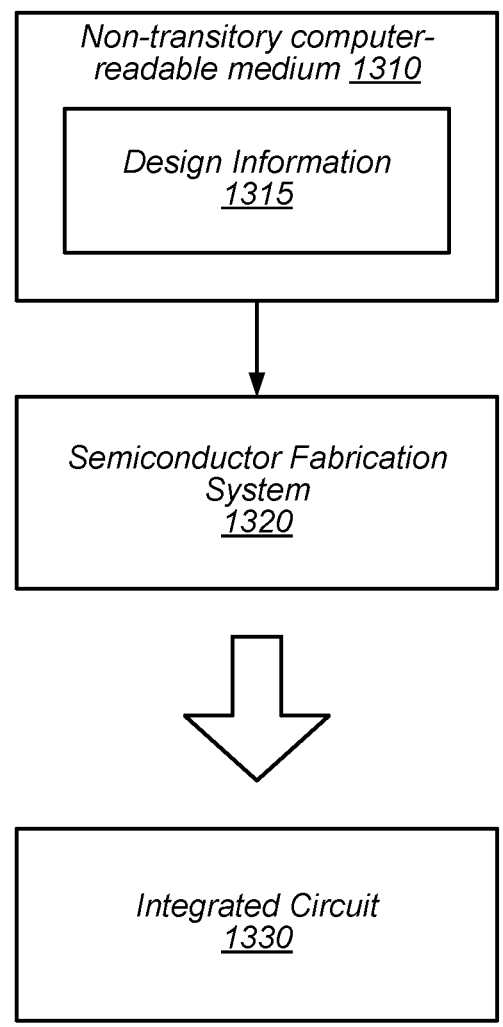
FIG. 13 illustrates an example of a non-transitory computer-readable storage medium that stores circuit design information.

FIG. 13 is a block diagram illustrating an example of a non-transitory computer-readable storage medium that stores circuit design information, according to some embodiments. In the illustrated embodiment, semiconductor fabrication system 1320 is configured to process the design information 1315 stored on non-transitory computer-readable storage medium 1310 and fabricate integrated circuit 1330 based on the design information 1315.

Non-transitory computer-readable storage medium 1310, may comprise any of various appropriate types of memory devices or storage devices. Non-transitory computer-readable storage medium 1310 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1310 may include other types of non-transitory memory as well or combinations thereof. Non-transitory computer-readable storage medium 1310 may include two or more memory mediums, which may reside in different locations, e.g., in different computer systems that are connected over a network.

Design information 1315 may be specified using any of various appropriate computer languages, including hardware description languages such as, without limitation: VHDL, Verilog, SystemC, SystemVerilog, RHDL, M, MyHDL, etc. Design information 1315 may be usable by semiconductor fabrication system 1320 to fabricate at least a portion of integrated circuit 1330. The format of design information 1315 may be recognized by at least one semiconductor fabrication system, such as semiconductor fabrication system 1320, for example. In some embodiments, design information 1315 may include a netlist that specifies elements of a cell library, as well as their connectivity. One or more cell libraries used during logic synthesis of circuits included in integrated circuit 1330 may also be included in design information 1315. Such cell libraries may include information indicative of device or transistor level netlists, mask design data, characterization data, and the like, of cells included in the cell library.

Integrated circuit 1330 may, in various embodiments, include one or more custom macrocells, such as memories, analog or mixed-signal circuits, and the like. In such cases, design information 1315 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1320 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1320 may also be configured to perform various testing of fabricated circuits for correct operation.

In various embodiments, integrated circuit 1330 is configured to operate according to a circuit design specified by design information 1315, which may include performing any of the functionality described herein. For example, integrated circuit 1330 may include any of various elements shown or described herein. Further, integrated circuit 1330 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
a switch circuit including a plurality of devices, a capacitor, and a switch node coupled to a regulated power supply node via an inductor, wherein the switch circuit is configured to:
couple, during a first time period of a first cycle of a particular switching sequence, the capacitor between an input power supply node and the switch node using a first subset of the plurality of devices;
couple, during a second time period of the first cycle of the particular switching sequence, the capacitor between the switch node and a ground supply node using a second subset of the plurality of devices; and
couple, during a third time period of the first cycle of the particular switching sequence, the switch node to the input power supply node using a third subset of the plurality of devices; and
a control circuit configured to adjust a duration of the third time period based on a voltage level of the input power supply node, a voltage level of the regulated power supply node, a value of the inductor, and respective durations of first time period and the second time period.

2. The apparatus of claim 1, wherein to adjust the duration of the third time period, the control circuit is further configured to:
perform a comparison of a ramp voltage to a threshold voltage; and
adjust, the duration of the third time period of the first cycle using results of the comparison.

3. The apparatus of claim 2, wherein the control circuit is further configured to:
generate a tracking current using the voltage level of the input power supply node; and
generate the threshold voltage using the tracking current and a reference current.

4. The apparatus of claim 3, wherein to generate the ramp voltage, the control circuit is further configured to:
generate a charge current using the voltage level of the input power supply node and the voltage level of the regulated power supply node; and
charge a capacitor using the charge current.

5. The apparatus of claim 2, wherein the control circuit is further configured to generate the ramp voltage using the voltage level of the input power supply node and the voltage level of the regulated power supply node.

6. The apparatus of claim 1, wherein the first time period and the second time period are fixed.

7. A method, comprising:
coupling, by a power converter circuit during a first portion of a first cycle of a particular switching sequence, an input power supply node to a switch node coupled to a regulated power supply node via an inductor;
coupling, by the power converter circuit during a second portion of the first cycle of the particular switching sequence, a capacitor between an input power supply node and the switch node;
coupling, by the power converter circuit during a third portion of the first cycle of the particular switching sequence, the switch node to ground supply node; and
adjusting, by the power converter circuit, a duration of the first portion of the first cycle of the particular switching sequence based on a voltage level of the input power supply node, a voltage level of the regulated power supply node, a value of the inductor, and respective durations of second and third portions of the first cycle.

8. The method of claim 7, further comprising:
performing, by the power converter circuit, a comparison of the voltage level of the regulated power supply node and the voltage level of the input power supply node; and
selecting, by the power converter circuit, a different switching sequence using results of the comparison.

9. The method of claim 8, further comprising:
coupling, by the power converter circuit during a first portion of a given cycle of the different switching sequence, the input power supply node to the switch node; and
adjusting, by the power converter circuit, a duration of the first portion of the given cycle of the different switching sequence using the voltage level of the input power supply node, the voltage level of the regulated power supply node, and the value of the inductor.

10. The method of claim 7, wherein adjusting the duration of the first portion of the first cycle includes:

performing, by the power converter circuit, a comparison of a ramp voltage to a reference voltage; and adjusting, by the power converter circuit, the duration of the first portion of the first cycle using results of the comparison.

11. The method of claim 10, further comprising generating, by the power converter circuit, a charging current whose value is based on the voltage level of the input power supply node and the voltage level of the regulated power supply node; and charging, by the power converter circuit, a capacitor using the charging current to generate the ramp voltage.

12. The method of claim 10, further comprising:

generating, by the power converter circuit, a tracking current using the voltage level of the input power supply node; and combining, by the power converter circuit, a reference current and the tracking current to generate the reference voltage.

13. The method of claim 12, wherein combining, the reference current and the tracking current includes subtracting, by the power converter circuit, the tracking current from the reference current.

14. An apparatus, comprising:

a load circuit coupled to a regulated power supply node; and a power converter circuit that includes a switch node coupled to the regulated power supply node via an inductor, wherein the power converter circuit is configured to:

couple, during a first portion of a first cycle of a particular switching sequence, an input power supply node to the switch node;

couple, during a second portion of the first cycle of the particular switching sequence, a capacitor between an input power supply node and the switch node;

couple, during a third portion of the first cycle of the particular switching sequence, the switch node to ground supply node; and adjust a duration of the first portion of the first cycle of the particular switching sequence based on a voltage level of the input power supply node, a voltage level of the regulated power supply node, a value of the inductor, and respective durations of second and third portions of the first cycle.

15. The apparatus of claim 14, wherein the power converter circuit is further configured to:

perform a comparison of the voltage level of the regulated power supply node and the voltage level of the input power supply node; and select a different switching sequence using results of the comparison.

16. The apparatus of claim 15, wherein the power converter circuit is further configured to:

couple, during a first portion of a given cycle of the different switching sequence, the input power supply node to the switch node; and adjust a duration of the first portion of the given cycle of the different switching sequence using the voltage level of the input power supply node, the voltage level of the regulated power supply node, and the value of the inductor.

17. The apparatus of claim 14, wherein to adjust the duration of the first portion of the first cycle, the power converter circuit is further configured to:

perform a comparison of a ramp voltage to a reference voltage; and adjust the duration of the first portion of the first cycle using results of the comparison.

18. The apparatus of claim 17, wherein the power converter circuit is further configured to:

generate a charging current whose value is based on the voltage level of the input power supply node and the voltage level of the regulated power supply node; and charge a capacitor using the charging current to generate the ramp voltage.

19. The apparatus of claim 17, wherein the power converter circuit is further configured to:

generate a tracking current using the voltage level of the input power supply node; and combine a reference current and the tracking current to generate the reference voltage.

20. The apparatus of claim 19, wherein to combine the reference current and the tracking current, the power converter circuit is further configured to subtract the tracking current from the reference current.

* * * * *